United States Patent
Baum, Jr. et al.

(10) Patent No.: US 10,150,699 B2
(45) Date of Patent: Dec. 11, 2018

(54) X-RAY INDUCED COLORATION IN GLASS OR GLASS-CERAMIC ARTICLES

(71) Applicant: CORNING INCORPORATED, Corning, NY (US)

(72) Inventors: John F Baum, Jr., Painted Post, NY (US); Nicholas Francis Borrelli, Elmira, NY (US); Candy Elizabeth Card, Corning, NY (US); Matthew John Dejneka, Corning, NY (US); Eileen Marie Fanning, Corning, NY (US); Karen Estelle Fitzsimmons, Corning, NY (US)

(73) Assignee: CORNING INCORPORATED, Corning, NY (US)

(*) Notice: Subject to any disclaimer, the term of this patent is extended or adjusted under 35 U.S.C. 154(b) by 307 days.

(21) Appl. No.: 14/960,941

(22) Filed: Dec. 7, 2015

(65) Prior Publication Data

US 2016/0168023 A1    Jun. 16, 2016

Related U.S. Application Data

(60) Provisional application No. 62/090,670, filed on Dec. 11, 2014.

(51) Int. Cl.
| | |
|---|---|
| *C03C 3/083* | (2006.01) |
| *C03C 25/624* | (2018.01) |
| *C03C 3/062* | (2006.01) |
| *C03C 3/064* | (2006.01) |
| *C03C 3/085* | (2006.01) |
| *C03C 3/087* | (2006.01) |
| *C03C 3/091* | (2006.01) |
| *C03C 3/093* | (2006.01) |
| *C03C 3/095* | (2006.01) |
| *C03C 3/097* | (2006.01) |
| *C03C 4/02* | (2006.01) |
| *C03C 4/08* | (2006.01) |
| *C03C 23/00* | (2006.01) |
| *C03C 10/00* | (2006.01) |

(52) U.S. Cl.
CPC ............ *C03C 25/624* (2013.01); *C03C 3/062* (2013.01); *C03C 3/064* (2013.01); *C03C 3/085* (2013.01); *C03C 3/087* (2013.01); *C03C 3/091* (2013.01); *C03C 3/093* (2013.01); *C03C 3/095* (2013.01); *C03C 3/097* (2013.01); *C03C 4/02* (2013.01); *C03C 4/087* (2013.01); *C03C 10/0009* (2013.01); *C03C 10/0018* (2013.01); *C03C 23/003* (2013.01)

(58) Field of Classification Search
CPC ..... C03C 10/0018; C03C 3/062; C03C 3/085; C03C 10/0009; C03C 3/095; C03C 4/02; C03C 23/003; C03C 25/624; C03C 3/064; C03C 3/093; C03C 3/087; C03C 3/097; C03C 4/087; C03C 3/091; C03C 3/083
USPC ............................................ 428/220; 65/30.1
See application file for complete search history.

(56) References Cited

U.S. PATENT DOCUMENTS

| | | | | |
|---|---|---|---|---|
| 3,173,850 | A | | 3/1965 | Hood |
| 4,745,092 | A | * | 5/1988 | Prunier, Jr. ........... C04B 35/195 501/108 |
| 6,376,055 | B1 | * | 4/2002 | Kishida ..................... C03C 8/14 257/E23.009 |
| 6,448,195 | B2 | * | 9/2002 | Kishida ..................... C03C 8/14 257/E23.009 |
| 8,312,739 | B2 | | 11/2012 | Lee et al. |
| 8,561,429 | B2 | | 10/2013 | Allan et al. |
| 8,753,744 | B2 | * | 6/2014 | Borrelli ................... C03C 17/30 428/210 |
| 9,115,023 | B2 | * | 8/2015 | Beall ....................... C03B 20/00 |
| 9,403,716 | B2 | * | 8/2016 | Dejneka ................... C03C 3/091 |
| 9,604,874 | B2 | * | 3/2017 | Beall ................... C03C 10/0018 |
| 9,609,873 | B2 | * | 4/2017 | Borrelli ................... A01N 59/16 |
| 9,790,124 | B2 | * | 10/2017 | Dejneka ................... C03B 32/02 |
| 9,878,940 | B2 | * | 1/2018 | Baker ................. C03C 10/0054 |
| 2009/0263662 | A1 | * | 10/2009 | Shelestak ................ C03C 3/083 428/410 |

(Continued)

FOREIGN PATENT DOCUMENTS

| | | |
|---|---|---|
| JP | 2003137594 | 5/2003 |
| JP | 2008239405 | 10/2008 |

OTHER PUBLICATIONS

International Search Report and Written Opinion of the International Searching Authority; PCT/US2015/064178; dated Feb. 19, 2016.

(Continued)

*Primary Examiner* — Douglas J McGinty
(74) *Attorney, Agent, or Firm* — Kevin M. Johnson

(57) ABSTRACT

Embodiments of the present disclosure are directed to methods for inducing color change in glass and glass-ceramic articles. According to one embodiment, color change may be x-ray induced in glass or glass-ceramic articles. The method for x-ray inducing color change may include exposing the glass or glass-ceramic article to x-rays at a temperature of up to 200° C. to induce a colored area in the glass or glass-ceramic article. The glass or glass-ceramic article may comprise: 50-85 mole % $SiO_2$; 5-25 mole % $Al_2O_3$; 0-15 mole % $P_2O_5$; 0-15 mole % $B_2O_3$; 5-25 mole % $R_2O$, wherein $R_2O=Li_2O+Na_2O+K_2O$.

12 Claims, 7 Drawing Sheets

(56) References Cited

U.S. PATENT DOCUMENTS

| | | | |
|---|---|---|---|
| 2012/0034435 A1* | 2/2012 | Borrelli | C03C 17/30 428/210 |
| 2013/0341228 A1 | 12/2013 | Click et al. | |
| 2014/0017462 A1* | 1/2014 | Borrelli | A01N 59/20 428/208 |
| 2014/0066285 A1* | 3/2014 | Beall | C03B 20/00 501/32 |
| 2014/0072783 A1* | 3/2014 | Borrelli | C03C 17/30 428/210 |
| 2014/0087194 A1* | 3/2014 | Dejneka | C03C 3/091 428/410 |
| 2015/0208664 A1* | 7/2015 | Borrelli | A01N 59/20 424/411 |
| 2015/0239772 A1* | 8/2015 | Baker | C03C 3/093 428/410 |
| 2015/0321947 A1* | 11/2015 | Beall | C03B 20/00 501/32 |
| 2015/0368147 A1* | 12/2015 | Dejneka | C03C 3/091 428/410 |
| 2016/0340230 A1* | 11/2016 | Beall | C03C 3/112 |
| 2017/0362119 A1* | 12/2017 | Dejneka | C03C 4/082 |
| 2018/0022640 A1* | 1/2018 | Dejneka | C03C 4/005 |

OTHER PUBLICATIONS

Kadono et al; "Effect of Additive Ions on the Optical Density and Stability of the Color Centers Induced by X-Ray Irradiation in Soda-Lime Silicate Glass"; Nuclear Instruments and Methods in Physics Research B, 267 (2009)2411-2415.

Samoilenko et al; "CW Laser Discoloration of X-Ray Irradiated Silver Doped Silicate Glasses"; Opticals Materials, 30 (2008)1715-1722.

Sheng et al; "Induced optical absorption in x-ray irradiated commercial soda-lime-silica glass"; Phys. Chem. Glasses, 2002, 43 (5), 254-9.

Yamashita et al; "X-ray irradiation-induced coloration of manganese in soda-lime silicate glass"; Journal of Non-Crystalline Solids; 333 (2004) 37-43.

* cited by examiner

X-RAY INDUCED COLORATION IN GLASS OR GLASS-CERAMIC ARTICLES

This application claims the benefit of priority under 35 U.S.C. § 119 of U.S. Provisional Application Ser. No. 62/090,670 filed on Dec. 11, 2014 the content of which is relied upon and incorporated herein by reference in its entirety.

BACKGROUND

The present disclosure is generally related to glass and glass-ceramic articles and to processes for coloring glass and glass-ceramic articles.

Glasses, for example strengthened glasses, may be used as cover plates or windows for portable or mobile electronic communication and entertainment devices, such as cellular phones, smart phones, tablets, video players, information terminal (IT) devices, laptop computers and the like. As used herein, the term "cover plate" or "cover glass" includes windows or the like for display and touch screen applications, as well as in other applications requiring transparency, high strength and abrasion resistance. Additionally, the cover glass may be used as decorative pieces such as the back and side surfaces of electronic devices. Glass-ceramics can also be used for the back and side surfaces of electronic devices. Additionally, other glasses, which have not been chemically strengthened, are utilized as display glasses. It may be desirable to color at least a portion of a glass article. For example, manufactures may desire to image their name, logo, brand, or other product information directly onto a glass surface, such as, for example, a sunglass lense, glass bottle, container, window, cover, or other article. Accordingly, there is a need for methods to produce colored glass articles.

SUMMARY

Embodiments of the present disclosure are directed to methods for inducing color change in glass and glass-ceramic articles. According to one embodiment, color change may be x-ray induced in glass or glass-ceramic articles. The method for x-ray inducing color change may comprise exposing the glass or glass-ceramic article to x-rays at a temperature of up to 200° C. to induce a colored area in the glass or glass-ceramic article. The glass or glass-ceramic article may comprise: 50-85 mole % $SiO_2$; 5-25 mole % $Al_2O_3$; 0-15 mole % $P_2O_5$; 0-15 mole % $B_2O_3$; 5-25 mole % $R_2O$, wherein $R_2O=Li_2O+Na_2O+K_2O$.

According to another embodiment, a colored glass or glass-ceramic article may have a thickness ≤1.5 mm and may comprise an x-ray induced colored area in the glass or glass-ceramic article. The glass article or glass-ceramic article may comprise 55-75 mole % $SiO_2$; 5-25 mole % $Al_2O_3$; 0-10 mole % $P_2O_5$; 0-10 mole % $B_2O_3$; 5-25 mole % $R_2O$, wherein $R_2O=Li_2O+Na_2O+K_2O$; and 0.1 to 2 mole % of at least one coloring agent chosen from CuO, $MnO_2$, $Ag_2O$, or combinations thereof.

BRIEF DESCRIPTION OF THE DRAWINGS

The following detailed description of specific embodiments of the present disclosure can be best understood when read in conjunction with the drawings enclosed herewith.

Figure 1:
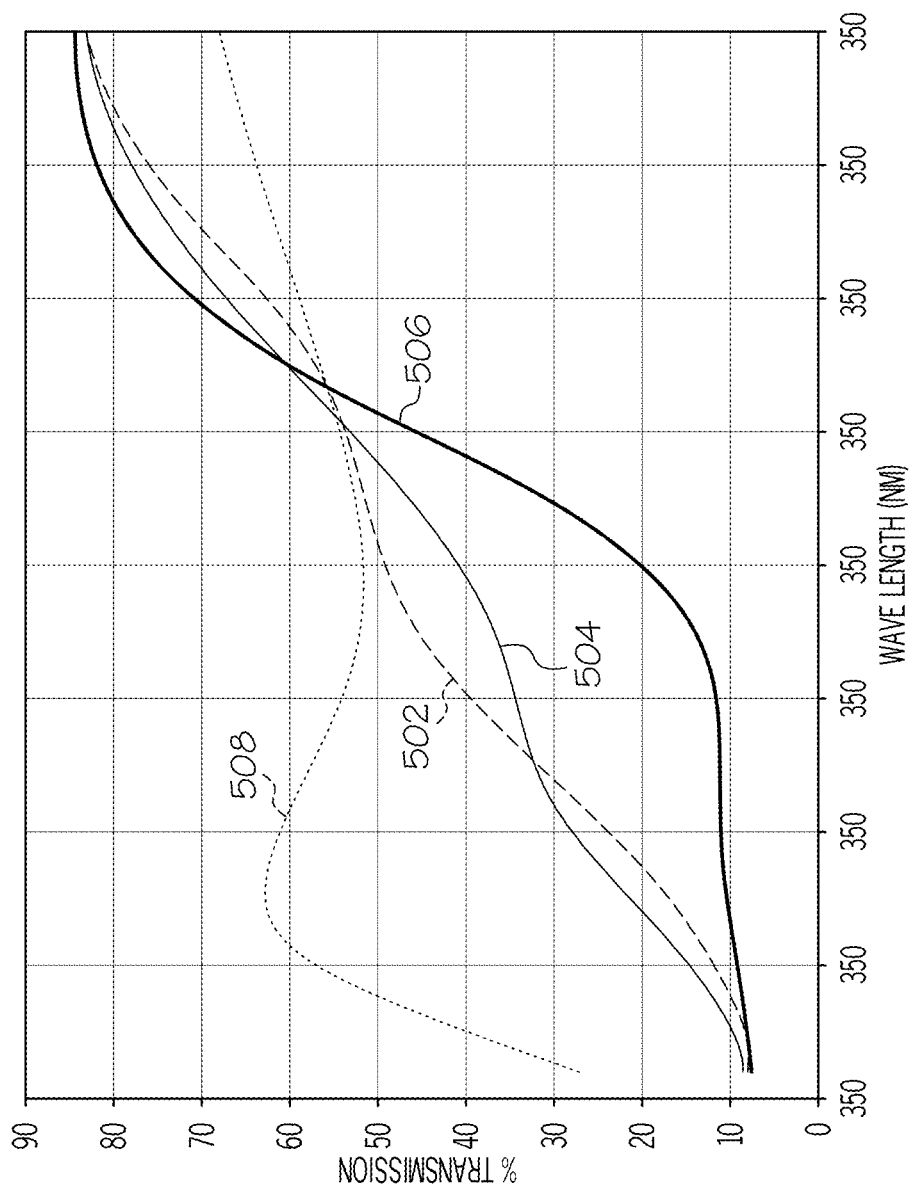
FIG. 1 is a graph depicting the percent transmission of light as a function of wavelength for colored portions of glass articles, according to one or more embodiments described herein.

The embodiments set forth in the drawings are illustrative in nature and not intended to be limiting of the invention defined by the claims. Moreover, individual features of the drawings will be more fully apparent and understood in view of the detailed description.

DETAILED DESCRIPTION

Generally, glass and glass-ceramic articles may be colored by exposing the glass or glass-ceramic article to x-ray radiation. Depending upon the glass composition and/or the conditions of the x-ray processing, specific colors can be produced in an area of the glass article. For example, a colored layer of up to about 20 mm thick may be produced, or the colored area of a glass sheet may extend through the entire thickness of an article thinner than about 20 mm. A glass or glass-ceramic article prior to x-ray exposure may be colorless, and may be colored by exposure to x-ray radiation. As used herein, colorless means that the glass or glass-ceramic has a* less than 5, 4, 3, 2, or even 1, and b* is less than 5, 4, 3, 2, or even 1 in L*a*b* color coordinates. Generally, a method for x-ray inducing color change in glass or glass-ceramic articles may include providing one or more glass or glass-ceramic articles and exposing the glass or glass-ceramic articles to x-ray radiation to induce a colored area in the glass or glass-ceramic article. Only the portion of the article exposed to the x-rays will undergo a color change, so patterns and designs can easily be produced either by masking a collimated x-ray beam or by scanning an x-ray beam on the article. The temperature of the glass or glass-ceramic article throughout the x-ray exposure may be up to about 200° C. In other embodiments, the temperature of the glass or glass-ceramic article throughout the x-ray exposure may be up to about 160° C., 140° C., or 120° C. Temperatures of the glass over environmental temperatures may be caused by the x-ray exposure, but in some embodiment, no additional heating is necessary. The color change may be achieved without additional heating following the x-ray exposure. The glass or glass-ceramic article following x-ray exposure may comprise an x-ray induced colored area embedded in and at least partially below at least one surface of the glass or glass-ceramic article.

The glass or glass-ceramic articles that are colored by the processes described herein may generally have any geometry or composition, as many glass thicknesses and compositions are contemplated herein. In one embodiment, the glass or glass-ceramic article may be chemically tempered, such as through ion exchange processing. In some embodiments, the glass may be shaped as a sheet, such as a sheet having a thickness ≤1.5 mm. For example, the glass or glass-ceramic article may comprise a thickness ≤1.3 mm, from 0.1 mm to 1.0 mm, or from 0.2 mm to 0.8 mm. In one embodiment, the thickness of the glass sheet is less than 0.7 millimeters and the area of each of the major surfaces are greater than 60 square centimeters. Glass sheets may be formed through, for example, a down-drawing process such as a fusion drawing process. The glass or glass-ceramic article may be a substantially flat sheet, or may be a sheet that is three dimensionally shaped, such as a glass or glass-ceramic article suitable for a touch screen of a mobile electronic device. The article may also be, without limitation, a bottle, container, or even the lenses in sunglasses. Glass or glass-ceramic articles having complex geometries may easily be colored by the methods described herein since the glass or glass-ceramic articles are not directly contacted by equipment while being exposed to x-ray radiation.

To color the glass or glass-ceramic articles, the glass or glass-ceramic article is exposed to x-ray radiation on a surface of the glass or glass-ceramic article. The x-ray radiation may be substantially perpendicular to the surface of the glass or glass-ceramic article, or may have an angle on incidence from about 5° to about 90° (perpendicular) relative to the surface of the glass or glass-ceramic article. X-ray radiation may be utilized from any suitable x-ray source. X-ray radiation generally has a wavelength in the range of 0.01 to 10 nanometers. Suitable power, voltage and current for the x-ray tube may be about 1 and 10 kW, 10 to 100 kV, and 10 to mA respectively. The total time of exposure to x-ray radiation may vary depending upon the x-ray power and intensity, and such times may be between about 0.1 min and 1000 min, about 1 min and 10 min, about 2 min and 8 min, about 0.01 min and 2 min, or about 1 min and 5 min. The glass may be colored at the exposed surface as well as under the exposed surface. In examples, the glass may be colored below the x-ray exposed surface at least 0.1 mm, 0.2 mm, 0.5 mm, 1.0 mm, 2.0 mm, or even more than 3.0 mm below the exposed surface. In one embodiment, the article may be ion-exchanged prior to x-ray exposure, and the composition of the glass at the surface compressive strength layer may be different from the composition in the interior of the glass. The color change may occur only in the compressive strength layer or a different color may be produced in the compressive strength layer than in the interior. The layer depth may be from about 1-500 microns in thickness.

In one embodiment, an x-ray mask may be utilized to shield portions of the glass or glass-ceramic article from the x-ray exposure. For example, an x-ray mask may be placed over the glass or glass-ceramic article prior to x-ray exposure, wherein the x-ray mask produces a color change pattern in the glass or glass-ceramic article upon x-ray exposure. The x-ray mask may be constructed of any material that is substantially opaque to x-ray radiation such as to absorb and/or reflect x-ray radiation, such as metallic materials. The x-ray mask may contain a "cut out" pattern that forms the outline of the colored image on the glass. The pattern may be any shape, including numeric or alphabetic symbols, logos, or any other design.

In one embodiment, the glass or glass-ceramic article may be chosen from aluminosilicates, phosphosilicates, boroaluminosilicates, alkali aluminosilicates or alkaline earth aluminosilicates, or may have a composition comprising 50-85 mol % $SiO_2$, 5-25 mol % $Al_2O_3$, 0-15 mol % $P_2O_5$, and 0-15 mol % $B_2O_3$. As used herein 0% of a component means that no detectable amount of that component is present in the glass composition, or only trace amounts of that composition are present, such as less than about 0.01 mol %. In various embodiments, the glass or glass-ceramic articles may comprises 55-75 mol % $SiO_2$, or 60-70 mol % or $SiO_2$, or 50-80 mol % $SiO_2$, or 50-75 mol % $SiO_2$, or 50-70 mol % $SiO_2$, or 50-65 mol % $SiO_2$, or 50-60 mol % $SiO_2$, or 55-85 mol % $SiO_2$, or 60-85 mol % $SiO_2$, or 65-85 mol % $SiO_2$, or 75-85 mol % $SiO_2$.

The glass or glass-ceramic articles may be alkali aluminosilicate, borosilicate, or phosphosilicate. In another embodiment, the glass or glass-ceramic articles may comprise alkali components. The alkali components may be included in amounts of 5-25 mol % $R_2O$, wherein $R_2O$ is one or more of $Li_2O$, $Na_2O$, and $K_2O$. As used herein, the amount of $R_2O$ is equal to the sum of the amount of $Li_2O$, $Na_2O$, and $K_2O$ in the glass composition. In another embodiment, the glass or glass-ceramic articles may comprise alkaline earth components. These alkaline earth components may be included in amounts up to 17 mol % RO, wherein RO is one or more of MgO, CaO, SrO, BaO, and ZnO. Alkali and alkaline earth oxides create non-bridging oxygens (NBO's) in the glass network. When exposed to ionizing radiation such as x-rays, electrons can be ejected from the NBO, creating a trapped hole called a non-bridging oxygen hole center (NBOHC). These defects create an absorption in the visible part of the spectrum and usually impart a green tint in aluminosilicates. Alkali aluminosilicates may be more strongly colored by x-rays than alkaline earth aluminosilicates. Thus, for strong coloration, the glass should contain at least 5 mole % $R_2O$, and in some embodiments more than 10 mole % for darker and faster coloration. Beyond 20 mole %, the glass durability and stability may suffer, so the glass may contain less than 25 mole % $R_2O$ and in some embodiments less than 20 mole % for glass stability. Alkaline earths may improve meltability, and can be used to tune thermal expansion and other properties. For chemically strengthened glasses, the RO content may be below 10 mole % and in some embodiments below 5 mole % for suitable ion exchange performance. In further embodiments, the glass or glass-ceramic articles may comprise 0-7 mol % RO, or 0-4 mol % RO. In embodiments, the glass or glass-ceramic article may comprise 5-20 mol % $R_2O$, or 10-15 mol % $R_2O$, or 15-25 mol % $R_2O$, or 20-25 mol % $R_2O$. In some embodiments, the glass or glass-ceramic article may comprise 5-20 mol % $Na_2O$, or 12-20 mol % $Na_2O$, or 14-20 mol % $Na_2O$, or 16-20 mol % $Na_2O$, or 18-20 mol % $Na_2O$, or 10-18 mol % $Na_2O$, or 10-16 mol % $Na_2O$, or 10-14 mol % $Na_2O$, or 10-12 mol % $Na_2O$.

In some embodiments, the glass composition may comprise $Al_2O_3$ (sometimes referred to as aluminosilicate glass). In various embodiments, the glass or glass-ceramic articles may comprise 5-25 mol % $Al_2O_3$, or 10-20 mol % $Al_2O_3$, or 5-20 mol % $Al_2O_3$, or 5-15 mol % $Al_2O_3$, or 5-10 mol % $Al_2O_3$, or 10-25 mol % $Al_2O_3$, or 15-25 mol % $Al_2O_3$, or 20-25 mol % $Al_2O_3$.

In further embodiments, the glass composition may comprise $P_2O_5$ (sometimes referred to as phosphosilicate glass). However, it should be understood that not all glass compositions described herein comprise $P_2O_5$. Upon exposure to ionizing radiation such as x-rays, phosphosilicate glasses can form phosphorous non-bridging oxygen hole centers (PNBOHC's) which impart a red or pink color to the glass. For a red color, the glass may contain at least 1 mole % $P_2O_5$ and in some embodiments more than 4 mole % to favor more PNBOHC at the expense of NBOHC resulting in a brighter red or a mixed red and green color resulting in a dull brown. Above 10 mole % $P_2O_5$, the glasses become harder to melt and the durability may suffer. In various embodiments, the glass or glass-ceramic article may comprise 0-10 mol % $P_2O_5$, or 1-10 mol % $P_2O_5$, or 2-10 mol % $P_2O_5$, or 4-10 mol % $P_2O_5$, or 6-10 mol % $P_2O_5$, or 8-10 mol % $P_2O_5$, or 0-8 mol % $P_2O_5$, or 0-6 mol % $P_2O_5$, or 0-4 mol % $P_2O_5$, or 0-2 mol % $P_2O_5$.

In another embodiment, the glass composition may comprise $B_2O_3$, sometimes referred to as borosilicate glass. However, it should be understood that not all glass compositions described herein comprise $B_2O_3$. Charge balanced borosilicate glasses may form a brown coloration upon x-ray exposure. While $B_2O_3$ may impart damage resistance to the glass and lower the CTE and processing temperatures, it also may impede ion exchange for chemically strengthened glasses, so glasses may contain between 0 and 20 mole % $B_2O_3$. In some embodiments, the $B_2O_3$ content may be below 10% to prevent the glass from being too soft or phase separating. For ion exchange applications the $B_2O_3$ content may be below 10% and in some embodiments less than 7 mole %. In various embodiments, the glass or glass-ceramic article may comprise 0-10 mol % $B_2O_3$, or 1-10 mol % $B_2O_3$, or 2-10 mol % $B_2O_3$, or 4-10 mol % $B_2O_3$, or 6-10 mol % $B_2O_3$, or 8-10 mol % $B_2O_3$, or 0-8 mol % $B_2O_3$, or 0-6 mol % $B_2O_3$, or 0-4 mol % $B_2O_3$, or 0-2 mol % $B_2O_3$.

Moreover, the glass or glass-ceramic article composition may be defined by at least one of the following equations: $-20$ mol % $< R_2O + RO - (Al_2O_3 + P_2O_5 + B_2O_3) < 20$ mol %; $-15$ mol % $< R_2O + RO - (Al_2O_3 + P_2O_5 + B_2O_3) < 15$ mol %; or $-10$ mol % $< R_2O + RO - (Al_2O_3 + P_2O_5 + B_2O_3) < 10$ mol %; or $-5$ mol % $< R_2O + RO - (Al_2O_3 + P_2O_5 + B_2O_3) < 5$ mol %. Keeping this quantity closer to 0 may impart a high liquidus viscosity, good damage resistance, and fast ion exchange.

In one embodiment, a green/khaki color may be produced in alkali aluminosilicate glass by x-ray exposure. For example, aluminosilicate glass or glass-ceramic articles comprising at least 5% $Al_2O_3$ and having a relatively high content of non-bridging oxygens may produce a green or khaki color. Non-bridging oxygens can be estimated by the quantity $(R_2O + RO - Al_2O_3)$. A relatively high content of non-bridging oxygens (NBOs) may be represented by a value of $(R_2O + RO - Al_2O_3)$ of at least about 2 mol %, at least about 4 mol %, at least about 6 mol %, at least 8 mol %, or even at least 10 mol %. In another embodiment, glass compositions comprising at least 5% $Al_2O_3$, or at least about 1%, or at least 2% or even at least 3% $P_2O_3$, and a relatively low content of non-bridging oxygens (i.e., $(R_2O + RO - Al_2O_3)$ less than 5 mol %, or less than 4 mol %, or less than 3 mol %, or less than 2 mol %, or even or less than 1 mol %) may produce a rust or pink color.

In some embodiments, the glass or glass-ceramic article may comprise a coloring agent. Suitable coloring agents may include but are not limited to CuO, $MnO_2$, $Ag_2O$, $SnO_2$, or combinations thereof. The various coloring agents may produce different colors in the glass when exposed to x-ray radiation. For example, CuO containing glass or glass-ceramic may produce a peach color in the glass or glass-ceramic following x-ray exposure. Glasses melted with $MnO_2$ may produce $Mn^{2+}$ ions in the glass which are relatively colorless. However x-rays can photo-ionize and electron off of $Mn^{2+}$ to create $Mn^{3+}$ which produces a purple coloration following x-ray exposure. The presence of $Sn^{4+}$ in the glass or glass-ceramic may enhance the effect by trapping the photo electrons and converting $Sn^{4+}$ to $Sn^{2+}$ instead of returning to the $Mn^{3+}$. $Ag^+$ ions from $Ag_2O$ may produce a dark brown color in the glass or glass-ceramic following x-ray exposure as the $Ag^+$ is converted to metallic Ag. $Sn^{4+}$ and $Ce^{4+}$ ions in the glass can also enhance this effect by trapping the liberated photo electron. In embodiments, the glass or glass-ceramic article may comprise one or more of the coloring agents. In embodiments, the glass or glass-ceramic article may comprise one or more coloring agents, each coloring agent in an amount from 0.05-5.0 mol %, or 0.2-3.0 mol %, or 0.2-1.0 mol %, or 0.1-4.0 mol %, or 0.1-3.0 mol %, or 0.1-2.0 mol %, or 0.1-1.0 mol %, or 0.1-0.8 mol %, or 0.1-0.6 mol %, or 0.1-0.4 mol %, or 0.1-0.2 mol %, or 0.2-5.0 mol %, or 0.4-5.0 mol %, or 0.6-5.0 mol %, or 0.8-5.0 mol %, or 1.0-5.0 mol %, or 2.0-5.0 mol %, or 3.0-5.0 mol %, or 4.0-5.0 mol %. Generally, the intensity of the color produced can be controlled by the relative amount of coloring agent included in the glass composition. Greater amounts of a coloring agent may produce more rich/dark colors in the glass.

Regarding the coloring agent $MnO_2$, without being bound by theory, it is believe that most of the Mn in the glass is colorless $Mn^{2+}$, that is then converted to $Mn^{3+}$ via x-ray ionization and another polyvalent species to trap the generated electron such as $Mn^{2+}+Ce^{4+} \rightarrow Mn^{3+}+Ce^{3+}$ or $2Mn^{2+}+Sn^{4+} \rightarrow 2Mn^{3+}+Sn^{2+}$. Thus it may be advantageous to maintain a Mn/Sn ratio near 2 (between 1 and 3) for deepest coloration.

It is contemplated that various color-producing components in varying content amounts may be used in combination to create colors formed from the optical mixture of two or more colors. Multiple coloring agents and/or base compositions could be used to produce a color that is a combination of the colors produced by the individual coloring agents. For example, a $P_2O_5$ and MnO containing glass or glass-ceramic may produce a reddish purple since the $P_2O_5$ contributes to a red/pink color and the MnO contributes to a purple color. In another embodiment, the brightness of the color can be controlled by the power and time of x-ray exposure. Generally, longer x-ray times and/or more x-ray power will contribute to richer/brighter tones of color in the glass.

As stated above, some of the glass or glass-ceramic articles of the present disclosure are chemically tempered, sometimes referred to as strengthened glass or glass-ceramic articles. The glass or glass-ceramic article may be chemically strengthened and have a compressive layer extending from at least one surface of the glass or glass-ceramic article to a depth of layer of at least 20 µm into the glass or glass-ceramic article, the compressive layer having a maximum compressive stress of at least 200 MPa. Typically, glass or glass-ceramic articles, specifically alkali aluminosilicate glass or glass-ceramic articles, may be chemically tempered by ion exchange. In this process, ions in the surface layer of the glass are replaced by, or exchanged with, larger ions having the same valence or oxidation state. In those embodiments in which the glass or glass-ceramic article comprises, consists essentially of, or consists of an alkali aluminosilicate glass, both the ions in the surface layer of the glass and the larger ions are monovalent alkali metal cations, such as $Li^+$ (when present in the glass), $Na^+$, $K^+$, $Rb^+$, and $Cs^+$. Alternatively, monovalent cations in the surface layer may be replaced with monovalent cations other than alkali metal cations, such as $Ag^+$ or the like. If $Ag^+$ is ion exchanged into the surface of the glass or glass-ceramic, only the surface will contain $Ag^+$ ions, so the x-ray coloration of the $Ag^+$ ions to metallic Ag can be confined to a surface layer.

Ion exchange processes are typically carried out by immersing a glass or glass-ceramic article in a molten salt bath containing the larger ions to be exchanged with the smaller ions in the glass. It will be appreciated by those skilled in the art that parameters for the ion exchange process, including, but not limited to, bath composition and temperature, immersion time, the number of immersions of the glass in a salt bath (or baths), use of multiple salt baths, additional steps such as annealing, washing, and the like, are generally determined by the composition of the glass and the desired depth of layer and compressive stress of the glass that result from the strengthening operation. By way of example, ion exchange of alkali metal-containing glasses may be achieved by immersion in at least one molten bath containing a salt such as, but not limited to, nitrates, sulfates, and chlorides of the larger alkali metal ion. The temperature of the molten salt bath typically is in a range from about 380° C. up to about 450° C., while immersion times range from about 15 minutes up to about 40 hours. However, temperatures and immersion times different from those described above may also be used.

In addition, non-limiting examples of ion exchange processes in which glass is immersed in multiple ion exchange baths, with washing and/or annealing steps between immersions, are described in U.S. patent application Ser. No. 12/500,650, filed Jul. 10, 2009, by Douglas C. Allan et al., entitled "Glass with Compressive Surface for Consumer Applications" and claiming priority from U.S. Provisional Patent Application No. 61/079,995, filed Jul. 11, 2008, in which glass is by immersion in multiple, successive, ion exchange treatments in salt baths of different concentrations; and U.S. Pat. No. 8,312,739, by Christopher M. Lee et al., issued on Nov. 20, 2012, and entitled "Dual Stage Ion Exchange for Chemical Strengthening of Glass," and claiming priority from U.S. Provisional Patent Application No. 61/084,398, filed Jul. 29, 2008, in which glass by ion exchange in a first bath is diluted with an effluent ion, followed by immersion in a second bath having a smaller concentration of the effluent ion than the first bath. The contents of U.S. patent application Ser. No. 12/500,650 and U.S. Pat. No. 8,312,739 are incorporated herein by reference in their entirety. Further, the glass compositions of the present disclosure are down-drawable by processes known in the art, such as slot-drawing, fusion drawing, re-drawing, and the like, and have a liquidus viscosity of at least 130 kilopoise.

In another embodiment, the color change of the colored glass or glass-ceramic articles (following the x-ray coloring process described herein) may be substantially reduced by performing one or more melting steps. For example, the glass or glass-ceramic article may return to being substantially colorless following melting. As such, the glass or glass-ceramic articles may be recycled and may be utilized to create colorless glass and then be again colored by the processes described herein.

It should be noted that the processes described herein for coloring glass or glass-ceramic articles, as well as the colored glass or glass-ceramic articles described herein offer many advantages to some known techniques for producing colored glass or glass-ceramic articles. For example the glass can be colored following ion-exchange chemical tempering and the coloring can be performed in ambient conditions (i.e., room temperature at atmospheric pressure). On the other hand, thermal treatments necessary to color a glass may degrade the ion exchanged or thermally tempered stress profile of a glass or glass-ceramic article. Also, as explained herein, the color is determined by the glass composition. Accordingly, the same x-ray exposure can produce different coloring in different glasses, allowing for less x-ray equipment needed in processing.

Additionally, the colored portion of the glass may be at least 10 microns, 100 microns, 1 mm, or greater than 1 mm into the surface of the glass or glass-ceramic article so that chipping and peeling of the glass surface do not cause color change or loss. In another embodiment, the glass or glass-ceramic may be a laminate of different compositions so as to produce different colors in different layers of the glass or glass-ceramic. The x-rays can also beCorrected KS incident on the sample at an angle so as to produce louvers or other angles or 3-D patterns in the glass or glass-ceramic article. Many patterns can easily be applied to the glass based on patterned x-ray masks. For example, UV bleaching through a photographic negative or positive can be used to create photos in the glass.

EXAMPLES

The various embodiments of colored glass or glass-ceramic articles and processes for coloring such glass or glass-ceramic articles will be further clarified by the following examples. The examples are illustrative in nature, and should not be understood to limit the subject matter of the present disclosure.

Fusion drawn sheets of the compositions shown in Tables 1-7 (marked as Samples 1-33) were exposed to X-rays and observed for coloration. The amount of each chemical component present in each sample provided in Tables 1-7 is a molar ratio relative to the other components present, and as such, mol % of each component can be determined by dividing the amount of each component present by the total amount of all components in a given sample. Each of Samples 1-33 were clear/colorless prior to x-ray exposure. All of the glasses darkened and were colored after exposure only where the x-rays passed into the glass. Tables 1-7 show the resulting color of the glass in the portion of the glass exposed to x-ray radiation. Additionally, Samples 16-33 show the color of the glass in $L^*a^*b^*$ color coordinates and transmittance percent.

TABLE 1

| Component | Sample 1 | Sample 2 | Sample 3 | Sample 4 | Sample 5 | Sample 6 |
| --- | --- | --- | --- | --- | --- | --- |
| $SiO_2$ | 66.831 | 65.89 | 66.00 | 69.17 | 68.81 | 67.45 |
| $Al_2O_3$ | 11.027 | 10.27 | 10.26 | 8.53 | 10.26 | 12.69 |
| $B_2O_3$ | 0 | 0.63 | 0.58 | 0.00 | 0.00 | 3.67 |
| $P_2O_5$ | 0 | 0 | 0 | 0 | 0 | 0 |
| $Na_2O$ | 12.915 | 13.91 | 14.23 | 13.94 | 15.25 | 12.30 |
| $K_2O$ | 2.363 | 2.45 | 2.37 | 1.17 | 0 | 1.37 |
| MgO | 5.724 | 5.86 | 5.75 | 6.45 | 5.46 | 2.36 |
| CaO | 0.077 | 0.57 | 0.59 | 0.54 | 0.06 | 0.03 |
| $SnO_2$ | 0.010 | 0 | 0.21 | 0.19 | 0.17 | 0.09 |
| Color | Khaki | Khaki | Khaki | Khaki | Khaki | Brown |

TABLE 2

| Component | Sample 7 | Sample 8 | Sample 9 | Sample 10 | Sample 11 |
| --- | --- | --- | --- | --- | --- |
| $SiO_2$ | 64.44 | 64.65 | 60 | 57.86 | 57.86 |
| $Al_2O_3$ | 13.90 | 13.93 | 15.38 | 16.53 | 15.35 |
| $B_2O_3$ | 7.15 | 5.11 | 0 | 0 | 0 |

TABLE 2-continued

| Component | Sample 7 | Sample 8 | Sample 9 | Sample 10 | Sample 11 |
|---|---|---|---|---|---|
| $P_2O_5$ | 0 | 0 | 5.15 | 6.45 | 6.61 |
| $Na_2O$ | 14.03 | 13.75 | 16.49 | 16.51 | 16.65 |
| $K_2O$ | 0.54 | 0.00 | 0 | 0 | 2.36 |
| MgO | 0.01 | 2.38 | 2.88 | 2.55 | 1.08 |
| CaO | 0.06 | 0.14 | 0 | 0.05 | 0 |
| $SnO_2$ | 0.08 | 0.08 | 0.1 | 0.05 | 0.10 |
| Color | Brown | Brown | Rust/Pink | Rust/Pink | Rust/Pink |

TABLE 3

| Component | Sample 12 | Sample 13 | Sample 14 | Sample 15 |
|---|---|---|---|---|
| $SiO_2$ | 67.734 | 68.210 | 57.854 | 53.398 |
| $Al_2O_3$ | 11.084 | 12.587 | 14.678 | 14.593 |
| $B_2O_3$ | 1.339 | 1.887 | 0.027 | 0.028 |
| $P_2O_5$ | 0.000 | 0.000 | 7.595 | 7.710 |
| $Na_2O$ | 12.357 | 10.737 | 14.947 | 14.790 |
| $K_2O$ | 0.828 | 0.692 | 0.500 | 0.476 |
| MgO | 5.611 | 5.244 | 1.466 | 0.426 |
| CaO | 0.683 | 0.307 | 0.034 | 0.051 |
| $SnO_2$ | 0.101 | 0.088 | 0.068 | 0.070 |
| $MnO_2$ | 0.205 | 0.187 | 0.002 | 0.001 |
| $ZrO_2$ | 0.016 | 0.022 | 0.042 | 0.044 |
| $TiO_2$ | 0.008 | 0.008 | 2.782 | 3.409 |
| $Fe_2O_3$ | 0.026 | 0.025 | 0.006 | 0.004 |
| SrO | 0.006 | 0.006 | 0.000 | 0.000 |
| Color | purple | purple | brown | brown |

TABLE 4

| Component | Sample 16 | Sample 17 | Sample 18 | Sample 19 |
|---|---|---|---|---|
| $SiO_2$ | 56.81 | 56.81 | 56.81 | 56.81 |
| $Al_2O_3$ | 16.5 | 16.5 | 16.5 | 16.5 |
| $Na_2O$ | 17.04 | 17.04 | 17.04 | 17.04 |
| MgO | 2.81 | 2.81 | 2.81 | 2.81 |
| $SnO_2$ | 0 | 0.4 | 0.8 | 0 |
| $P_2O_5$ | 6.74 | 6.74 | 6.74 | 6.74 |
| $MnO_2$ | 0.8 | 0.8 | 0.8 | 0 |
| $Tb_2O_3$ | 0 | 0 | 0 | 0 |
| $Eu_2O_3$ | 0 | 0 | 0 | 0 |
| CuO | 0 | 0 | 0 | 0 |
| $Ag_2O$ | 0 | 0 | 0 | 0 |
| $CeO_2$ | 0 | 0 | 0 | 0 |
| Color | Violet | Purple | Purple | Red |
| L* | 71.61 | 74.18 | 76.4 | 56.06 |
| a* | 12.64 | 9.81 | 8.39 | 34.87 |
| b* | −2.11 | −7.63 | −7.7 | 30.76 |
| % Transmittance | 48.38 | 52.48 | 55.7 | 32.73 |

TABLE 5

| Component | Sample 20 | Sample 21 | Sample 22 | Sample 23 | Sample 24 |
|---|---|---|---|---|---|
| $SiO_2$ | 56.81 | 56.81 | 56.81 | 56.81 | 56.81 |
| $Al_2O_3$ | 16.5 | 16.5 | 16.5 | 16.5 | 16.5 |
| $Na_2O$ | 17.04 | 17.04 | 17.04 | 17.04 | 17.04 |
| MgO | 2.81 | 2.81 | 2.81 | 2.81 | 2.81 |
| $SnO_2$ | 0.4 | 0.1 | 0.1 | 0.1 | 0.1 |
| $P_2O_5$ | 6.74 | 6.74 | 6.74 | 6.74 | 6.74 |
| $MnO_2$ | 0 | 0 | 0 | 0 | 0 |
| $Tb_2O_3$ | 0 | 0.25 | 0 | 0 | 0 |
| $Eu_2O_3$ | 0 | 0 | 0.25 | 0 | 0 |
| CuO | 0 | 0 | 0 | 0.1 | 0 |
| $Ag_2O$ | 0 | 0 | 0 | 0 | 0.1 |
| $CeO_2$ | 0 | 0 | 0 | 0.2 | 0.2 |
| Color | Orange | Red | Red | Peach | Brown |
| L* | 78.54 | 63.19 | 64.69 | 87.72 | 37.78 |
| a* | 15.56 | 27.77 | 28.27 | 5.09 | 22.73 |
| b* | 17.86 | 53.8 | 27.64 | 10.02 | 57.52 |
| % Transmittance | 57.37 | 36.68 | 40.85 | 70.72 | 12.79 |

TABLE 6

| Component | Sample 25 | Sample 26 | Sample 27 | Sample 28 |
|---|---|---|---|---|
| $SiO_2$ | 64.65 | 64.65 | 64.65 | 64.65 |
| $Al_2O_3$ | 13.93 | 13.93 | 13.93 | 13.93 |
| $B_2O_3$ | 5.11 | 5.11 | 5.11 | 5.11 |
| $Na_2O$ | 13.75 | 13.75 | 13.75 | 13.75 |
| MgO | 2.38 | 2.38 | 2.38 | 2.38 |
| CaO | 0.1 | 0.1 | 0.1 | 0.1 |
| $SnO_2$ | 0.1 | 0.1 | 0.1 | 0.1 |
| $MnO_2$ | 0 | 0.1 | 0.2 | 0.4 |
| Color | Brown | Grey | Purple | Purple |
| L* | 78.41 | 79.15 | 78.79 | 77.02 |
| a* | 7.28 | 5 | 4.58 | 5.18 |
| b* | 14.59 | 3.88 | −1.91 | −6.98 |
| % Transmittance | 55.17 | 56.95 | 57.19 | 55.45 |

TABLE 7

| Component | Sample 29 | Sample 30 | Sample 31 | Sample 32 | Sample 33 |
|---|---|---|---|---|---|
| $SiO_2$ | 64.65 | 64.65 | 64.65 | 64.65 | 64.65 |
| $Al_2O_3$ | 13.93 | 13.93 | 13.93 | 13.93 | 13.93 |
| $B_2O_3$ | 5.11 | 5.11 | 5.11 | 5.11 | 5.11 |
| $Na_2O$ | 13.75 | 13.75 | 13.75 | 13.75 | 13.75 |
| MgO | 2.38 | 2.38 | 2.38 | 2.38 | 2.38 |
| CaO | 0.1 | 0.1 | 0.1 | 0.1 | 0.1 |
| $SnO_2$ | 0.1 | 0 | 0.2 | 0.4 | 0.8 |
| $MnO_2$ | 0.8 | 0.4 | 0.4 | 0.4 | 0.4 |
| Color | Purple | Purple | Purple | Purple | Purple |
| L* | 74.87 | 80.23 | 77 | 78.01 | 80.46 |
| a* | 6.21 | 4.29 | 5.05 | 4.69 | 3.82 |
| b* | −8.51 | −5.69 | −6.88 | −6.15 | −4.31 |
| % Transmittance | 52.68 | 60.5 | 55.34 | 56.8 | 60.4 |

Samples 1-5 are aluminosilicate glasses which contain significant concentrations of non-bridging oxygens, as estimated by the quantity ($R_2O+RO—Al_2O_3$). Samples 1-5 turned a greenish khaki color. Samples 6-8 contained $B_2O_3$ and relatively few non-bridging oxygens ($R_2O+RO—Al_2O_3$). Samples 6-8 all turned a brownish color. Samples 9-11 contain $P_2O_5$ and all turned a pink or red color upon or after exposure.

Samples 12-15 are glasses and glass-ceramics that can turn purple with X-ray exposure. Samples 12 and 13 contain Mn ions which contribute to the purple color following x-ray exposure. Samples 14 and 15 contain $TiO_2$ and turned brown. However after these glass samples were heat treated at 600° C. for 2 hours and 775 C.° for 4 hours to produce white rutile glass-ceramics, they then turned purple upon x-ray exposure.

Samples 16-24 are glass compositions containing phosphate. Specifically, Samples 16-18 are glass compositions containing varying amounts of $SnO_2$ in $MnO_2$ containing glass. Samples 16-18 show the effect adding $SnO_2$ to $MnO_2$ for $P_2O_5$ containing glasses. The exposed red color of the $P_2O_5$ containing base glass combined with the purple from the x-ray induced $Mn^{3+}$ results in a redder (larger a*) purple or violet tint. As $SnO_2$ is increased and the purple overwhelms the red tint, only the purple is observed in Samples 17 and 18. Samples 19 and 20 show that $SnO_2$ shifts the tint of the $P_2O_5$ glasses from red to orange. Samples 21-24 shows that the presence of Cu ions can induce a peach color and Ag ions initially present in the glass can result in a very dark brown coloration.

Samples 25-29 are glass compositions with varying amounts of $MnO_2$. Samples 30-33 are glass compositions with $MnO_2$ and varying amounts of $SnO_2$.

FIG. 1 shows the visible transmission spectra for Samples 4, 8, 10, and 31. Referring to FIG. 1, Sample 4 is marked as line 502, Sample 8 is marked as line 504, Sample 10 is marked as line 506, and Sample 31 is marked as 508.

Figure 2:
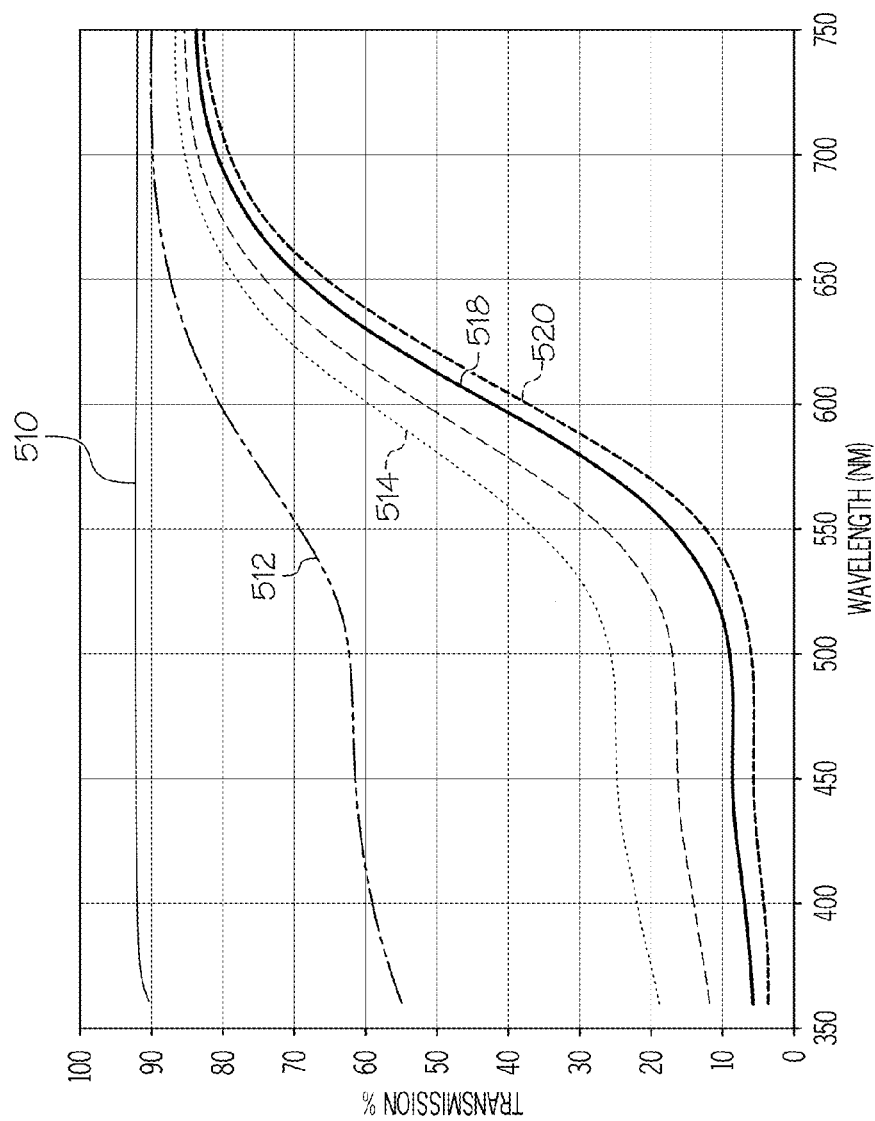
FIG. 2 is a graph depicting the percent transmission of light as a function of wavelength for glass articles having identical composition with varying x-ray exposure times, according to one or more embodiments described herein.

FIG. 2 shows how the transmission spectra changes as a function of X-ray exposure time. Specifically, FIG. 2 shows Sample 10 when exposed to varying x-ray exposure times. Referring to FIG. 2, line 510 shows the transmission of the glass of Sample 5 without x-ray exposure. Line 510 shows about 92% transmission across the visible spectrum. It is believed that the other 8% loss is due to Fresnel reflections on the two surfaces of the glass sample. Line 512 shows a glass having the composition of Sample 10 following a 1 minute exposure to X-rays, which induces large UV and visible absorption bands. For the case of Sample 10, these bands are in the blue and green portion of the spectrum and result in a red exposed glass. Line 514 represents a glass having the composition of Sample 10 following a 1 minute x-ray exposure, line 516 represents a glass having the composition of Sample 10 following a 2 minute x-ray exposure, 518 represents a glass having the composition of Sample 10 following a 4 minute x-ray exposure, and 520 represents a glass having the composition of Sample 10 following a 8 minute x-ray exposure. The first 1 min is at 30 kV and 80 mA on the x-ray tube and 3.8 mm distance from the x-ray tube window, the rest of the lines at 1, 2, 4, and 8 min are with 60 kV and 66 mA at 0 mm from the x-ray tube window.

Figure 3:
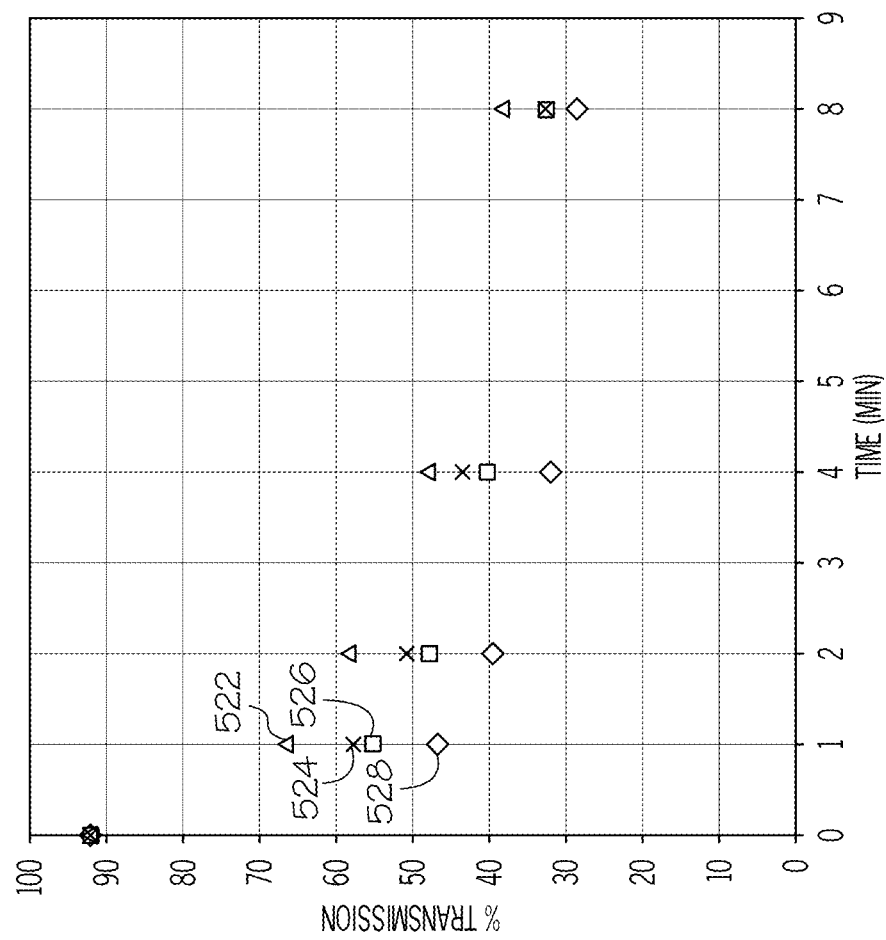
FIG. 3 is a graph depicting the transmission of light as a function of x-ray exposure time with varying x-ray tube voltage and current for glass articles having identical composition, according to one or more embodiments described herein.

FIG. 3 shows the effect of X-ray tube voltage and current on the transmission (of all visible light) of Sample 10 as a function of x-ray exposure time. The triangles (marked 522) correspond to x-ray radiation of 30 kV, 80 mA, and 2,400 W. The crosses (marked 524) correspond to x-ray radiation of 32 kV, 125 mA, and 4,000 W. The squares (marked 526) correspond to x-ray radiation of 60 kV, 40 mA, and 2,400 W. The diamonds (marked 528) correspond to x-ray radiation of 60 kV, 66 mA, and 3960 W. Even though the total power with 32 kV was greater than that with 60 kV, the 60 kV condition resulted in a greater light transmission decrease (of all visible light), demonstrating the light transmission was not a function of power alone.

Figure 4:
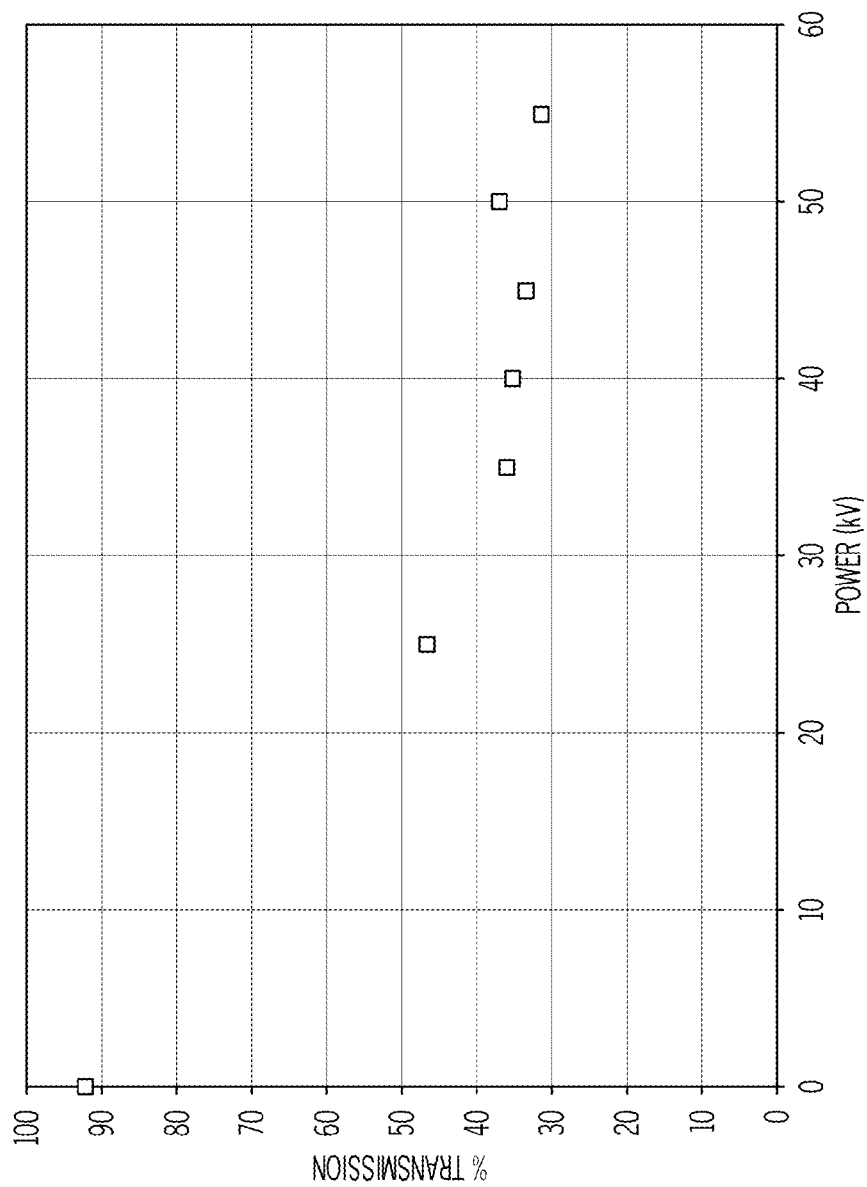
FIG. 4 is a graph depicting the transmission of light as a function of x-ray tube input power for colored glass articles, according to one or more embodiments described herein.

FIG. 4 shows the effect of x-ray voltage with fixed total power for Sample 10, which shows that higher tube voltages result in decreased transmission and more intense coloration. For the data of FIG. 4, the power was held at 3960 W.

Figure 5:
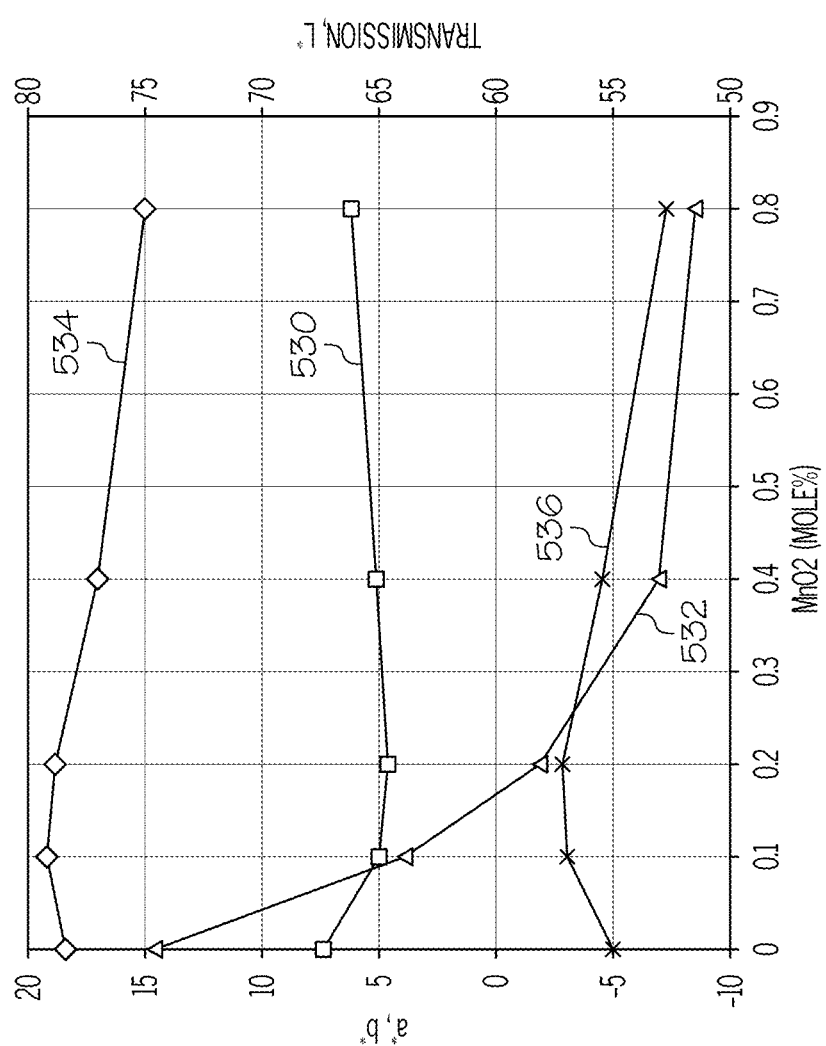
FIG. 5 is a graph depicting the light transmission and L*a*b* coordinates for colored glass articles with varying amounts of $MnO_2$, according to one or more embodiments described herein.

FIG. 5 shows the overall transmission and L*, a*, and b* color coordinates of Samples 25-29 which, except for varying amounts of $MnO_2$, have the same base glass composition. In FIG. 5, line 530 corresponds to a*, line 532 corresponds to b*, line 534 corresponds to L*, and line 536 corresponds to light transmission. The transmission and L*, a*, and b* are shown as a function of $MnO_2$ content in the glass. Higher amounts of $MnO_2$ shifts the x-ray induced color from brown to purple, resulting in lower L* and b* and greater a*, and giving rise to a darker, more intense purple color with increasing amounts of $MnO_2$.

Figure 6:
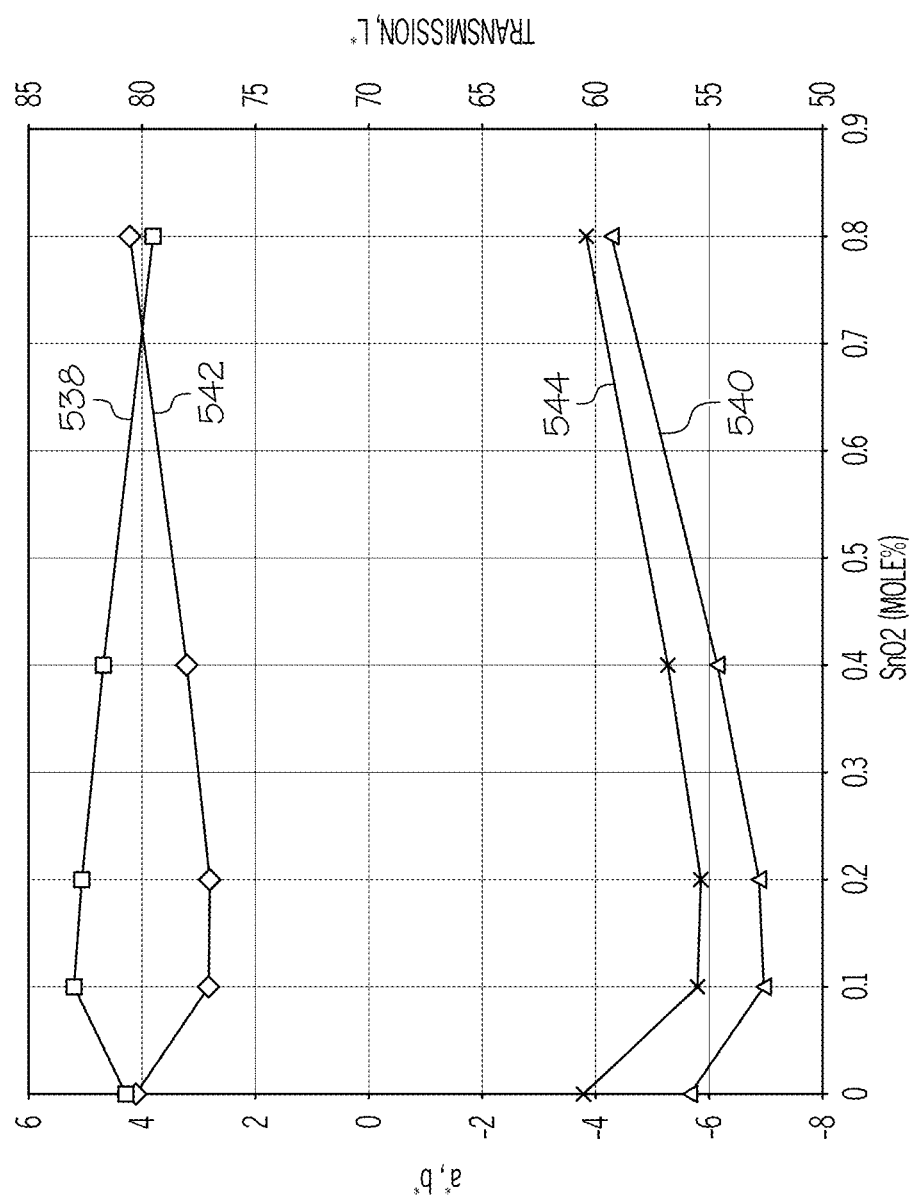
FIG. 6 is a graph depicting the light transmission and L*a*b* coordinates for colored glass articles with varying amounts of $SnO_2$, according to one or more embodiments described herein.

FIG. 6 shows the overall transmission and L*, a*, and b* color coordinates of Samples 30-34, which have the same glass composition except for varying amounts of $SnO_2$. In FIG. 6, a* is represented by line 538, b* is represented by like 540, L* is represented by line 542, and the total light transmission is represented by line 544. FIG. 6 shows the effect of adding a second additional polyvalent element ($SnO_2$) with the $MnO_2$. In this case more $SnO_2$ results in more purple $Mn^{3+}$ up until about 0.2% $SnO_2$ when a* and b* both start decreasing in absolute magnitude, resulting in less color. Based on the equation $2Mn^{2+}+Sn^{4+} \rightarrow 2Mn^{3+}+Sn^{2+}$, for every 2 moles of $MnO_2$, only 1 $SnO_2$ is needed to trap the generated electrons. Thus, without being bound by theory, it is believed that excess $SnO_2$ will only serve to block x-ray penetration and result in decreased coloration.

Figure 7:
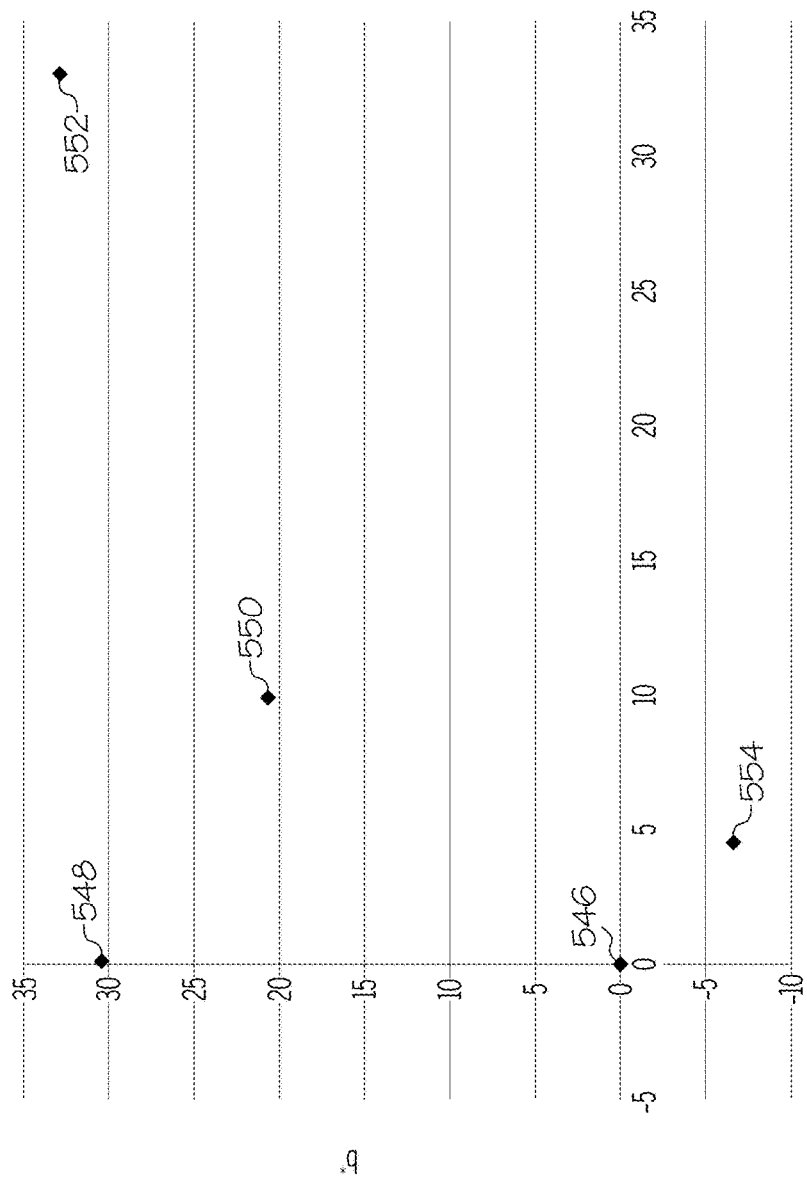
FIG. 7 is a graph depicting the a* and b* coordinates in L*a*b* color space for glass articles of varying composition, according to one or more embodiments described herein.

FIG. 7 shows a plot of the a* and b* of Samples 4, 8, 10, and 31. Referring to FIG. 1, Sample 10 without exposure to x-ray radiation is point 546 (clear/no color). Sample 4 is marked as point 548, Sample 8 is marked as point 550, Sample 10 is marked as point 552, and Sample 31 is marked as point 554.

It is further noted that terms like "preferably," "generally," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present disclosure.

It will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these aspects.

What is claimed is:

1. A colored glass or glass-ceramic article having a thickness ≤1.5 mm and comprising an x-ray induced colored area in the glass or glass-ceramic article, the glass or glass-ceramic article comprising:
   55-75 mole % $SiO_2$;
   5-25 mole % $Al_2O_3$;
   0-10 mole % $P_2O_5$;
   0-10 mole % $B_2O_3$;
   5-25 mole % $R_2O$, wherein $R_2O=Li_2O+Na_2O+K_2O$; and
   0.1 to 2 mole % of at least one coloring agent chosen from CuO, $MnO_2$, $Ag_2O$, or combinations thereof.

2. The article of claim 1, wherein the colored glass or glass-ceramic article comprises 2-10 mole % $B_2O_3$.

3. The article of claim 1, wherein the colored glass or glass-ceramic article comprises 2-10 mole % $P_2O_5$.

4. The article of claim 1, wherein the colored glass or glass-ceramic article comprises 55-75 mole % $SiO_2$.

5. The article of claim 1, wherein the colored glass or glass-ceramic article comprises 10-20 mole % $Al_2O_3$.

6. The article of claim 1, wherein the colored glass or glass-ceramic article comprises 0.2 to 1.0 mole % coloring agent.

7. The article of claim 1, wherein the coloring agent also includes $SnO_2$.

8. The article of claim 1, wherein the colored glass or glass-ceramic article comprises $-20$ mol %$<R_2O+RO-(Al_2O_3+P_2O_5+B_2O_3)<20$ mol %, wherein $RO=MgO+CaO+SrO+BaO+ZnO$.

9. The article of claim 1, wherein the colored glass or glass-ceramic article comprises $-10$ mol %$<R_2O+RO-(Al_2O_3+P_2O_5+B_2O_3)<10$ mol %, wherein $RO=MgO+CaO+SrO+BaO+ZnO$.

10. The article of claim 1, wherein the colored area comprises a layer that extends from a surface of the glass or glass-ceramic article to a depth of 1-500 μm.

11. The article of claim 1, wherein the glass or glass-ceramic article is chemically or thermally strengthened.

12. The article of claim 1, wherein the colored glass or glass-ceramic article comprises 10-20 mole % $Na_2O$.

* * * * *